US007224589B2

(12) United States Patent
Chou et al.

(10) Patent No.: US 7,224,589 B2
(45) Date of Patent: May 29, 2007

(54) INVERTER CIRCUIT FOR PRODUCING POWER FACTOR CORRECTION EFFECT

(75) Inventors: Chin-Wen Chou, Taipei Hsien (TW); Ying-Nan Cheng, Taipei Hsien (TW); Kuang-Ming Wu, Taipei Hsien (TW); Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 11/202,022

(22) Filed: Aug. 12, 2005

(65) Prior Publication Data

US 2007/0035979 A1 Feb. 15, 2007

(51) Int. Cl.
*H02M 3/335* (2006.01)

(52) U.S. Cl. .............................. 363/21.04; 363/21.12; 363/24; 363/40

(58) Field of Classification Search ............ 363/21.04, 363/21.12, 24, 40
See application file for complete search history.

(56) References Cited

U.S. PATENT DOCUMENTS 4,843,202 A * 6/1989 Smith et al. ................ 219/716
6,031,748 A * 2/2000 Hong .......................... 363/89
6,278,622 B1 * 8/2001 Shimazaki et al. ........... 363/37
6,556,457 B1 * 4/2003 Shimazaki et al. ........... 363/34
6,714,425 B2 * 3/2004 Yamada et al. .......... 363/21.12
6,775,156 B1 * 8/2004 Lin et al. ................... 363/21.1
7,045,969 B1 * 5/2006 Chou ......................... 315/247

* cited by examiner

*Primary Examiner*—Bao Q. Vu
(74) *Attorney, Agent, or Firm*—Birch, Stewart, Kolasch & Birch, LLP

(57) ABSTRACT

Provided is an inverter circuit including a rectification and filter circuit and an inverter driver circuit interconnected the rectification and filter circuit and a load. The inverter driver circuit comprises a second controller for receiving light adjustment cycle signals and outputting electrical conduction cycle signals wherein the second controller is either electrically connected to a power source or electrically connected to the rectification and filter circuit for obtaining a wave current, and an electrical conduction of the electrical conduction cycle signals depends on input on/off of the wave current at the second controller; and a driver operates in response to electrical conduction cycle signals and on/off of DC. A flashing effect is produced on the load and thus a power factor correction effect is produced without power factor corrector being involved.

3 Claims, 11 Drawing Sheets

INVERTER CIRCUIT FOR PRODUCING POWER FACTOR CORRECTION EFFECT

FIELD OF THE INVENTION

The present invention relates to inverter circuitry and more particularly to an inverter circuit for producing power factor correction effect without a high performance power factor corrector being involved.

BACKGROUND OF THE INVENTION

U.S. patent application Ser. No. 10/949,373 discloses a method of determining operating voltage of an inverter for overcoming drawbacks of a transformer operating in a single maximum high voltage oscillation in which a cost effective inverter circuit with power factor corrector being installed is shown in FIG. 1 and FIGS. 5A to 5F. A rectification and filter circuit 20 is adapted to convert AC from a power source 10 into DC. A driver 50 is adapted to divide duty cycle of voltage into a plurality of continuous voltage pulses each consisting of lowest input voltage, highest input voltage, and lowest input voltage of DC fed from a power factor corrector 90 connected to the rectification and filter circuit 20. Next, a varying voltage cycle corresponding to each voltage pulse is generated by a transformer 60. Finally, a dark, bright, and dark flashing effect is produced on a load (e.g. CRT) 70 in response to the varying voltage cycle. The Application is able to significantly decrease the cost of a high performance power factor corrector. Further, the Application is able to overcome drawbacks of a prior inverter operating in a single maximum high voltage oscillation since the inverter 60 is operating in a continuous voltage of smooth rising and smooth lowering cycle. As a result, a useful life of the inverter can be prolonged significantly.

SUMMARY OF THE INVENTION

It is therefore an object of the present invention to provide an inverter circuit including a rectification and filter circuit including a rectifier and a filter capacitor, and an inverter driver circuit interconnected the rectification and filter circuit and a load wherein a stable DC is generated by the rectification and filter circuit and is delivered to the inverter driver circuit, the inverter driver circuit comprising a first controller for receiving input light adjustment signals and outputting light adjustment cycle signals; a second controller for receiving the light adjustment cycle signals and outputting electrical conduction cycle signals wherein the second controller is either electrically connected to a power source or electrically connected to the rectification and filter circuit for obtaining a wave current, and an electrical conduction of the electrical conduction cycle signals depends on an input on/off of each of the wave current at the second controller; a driver for receiving the electrical conduction cycle signals and outputting varying voltage pulse signals in response to the input on/off of the DC wherein the varying voltage pulse signals are generated in response to the electrical conduction cycle signals being enabled or not by the input on/off of the DC; and a transformer for receiving the varying voltage pulse signals and outputting a converted voltage to the load for activation wherein the converted voltage is a varying voltage depending on the varying voltage pulse signals. By utilizing the present invention, a dark, bright, and dark flashing effect is produced on the load and thus a power factor correction effect is produced by the inverter circuit without a high performance power factor corrector being involved.

The above and other objects, features and advantages of the present invention will become apparent from the following detailed description taken with the accompanying drawings.

DETAILED DESCRIPTION OF THE PREFERRED EMBODIMENTS

Figure 1:
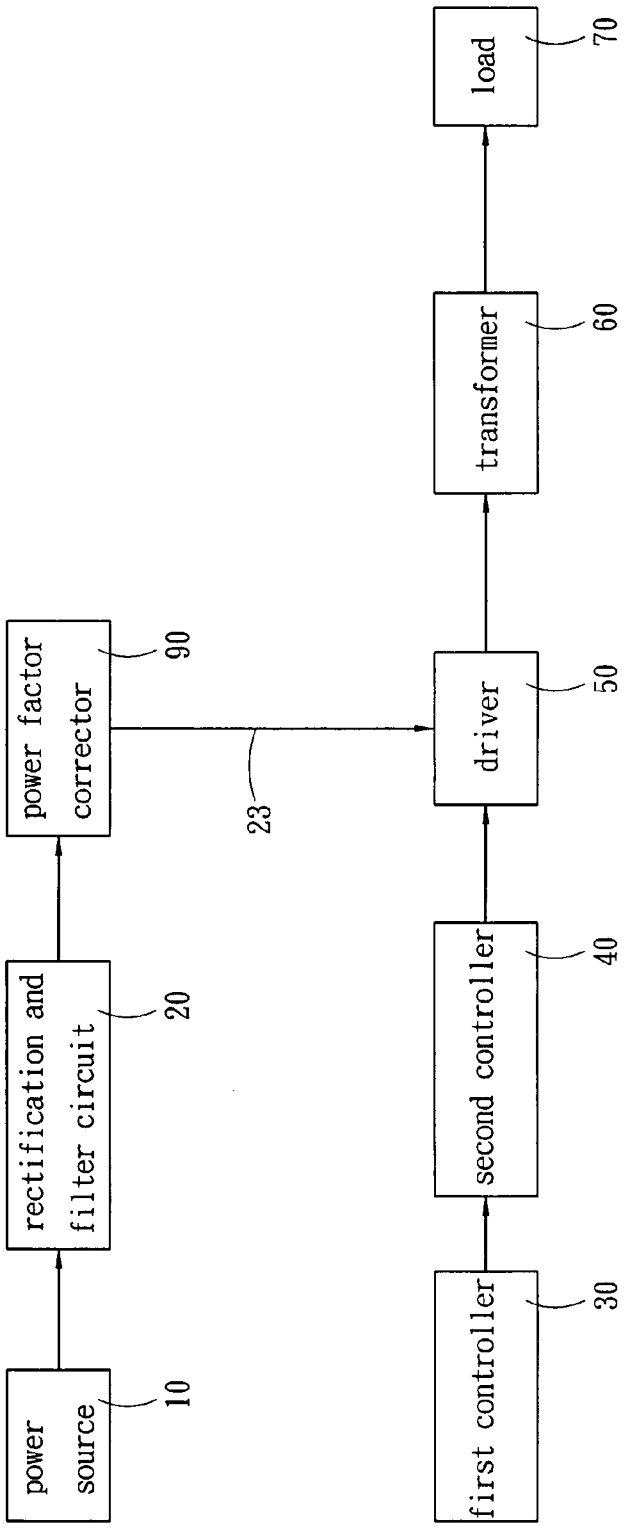
FIG. 1 is a block diagram of a conventional inverter circuit.
Figure 2:
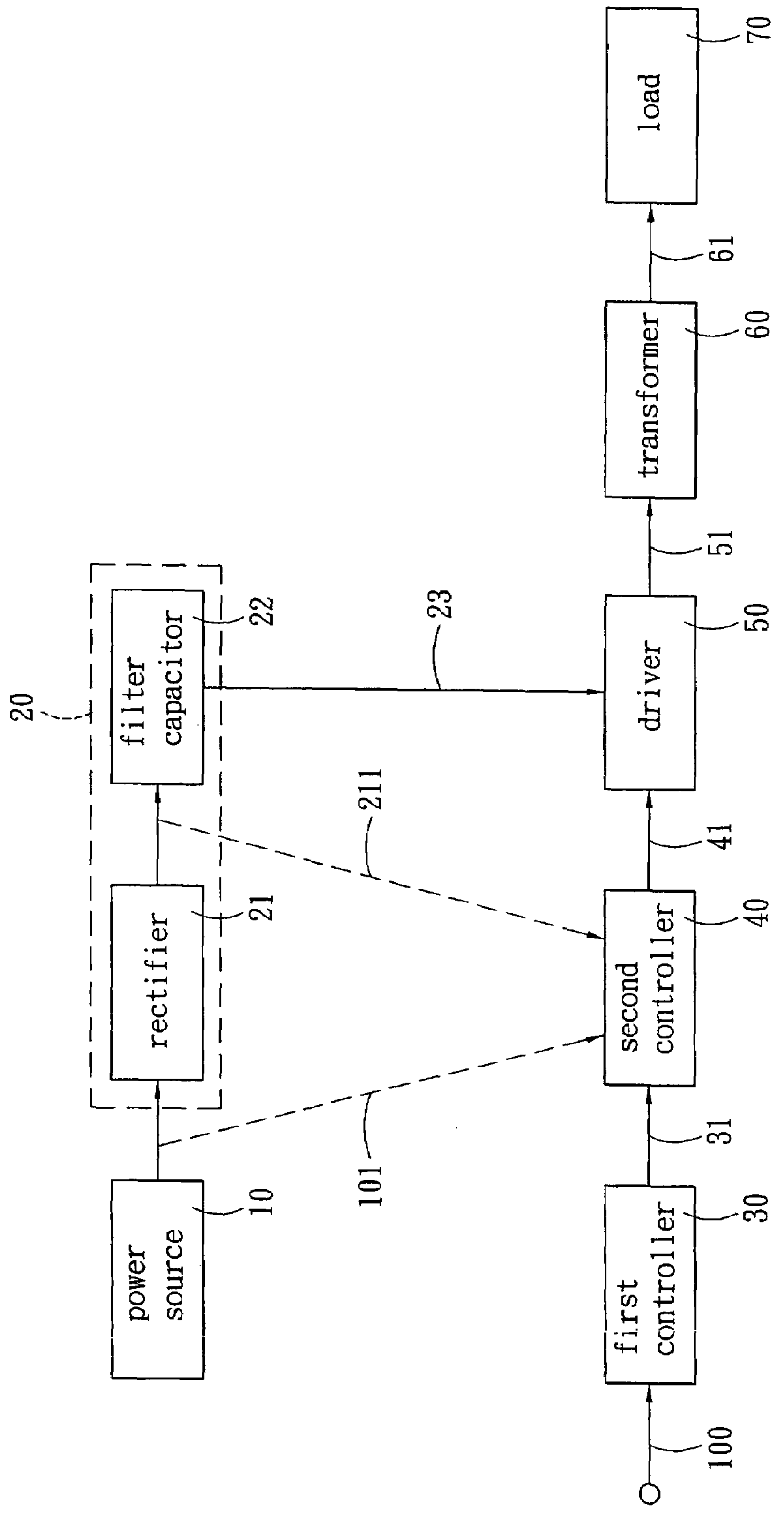
FIG. 2 is a block diagram of a first preferred embodiment of inverter circuit according to the invention.

Referring to FIG. 2, an inverter circuit in accordance with a first preferred embodiment of the invention is shown. The inverter circuit comprises a power source 10, a rectification and filter circuit 20 including a diode based full-wave or half-wave rectifier 21 and a filter capacitor 22, a load 70, and an inverter driver circuit interconnected the rectification and filter circuit 20 and the load 70 in which a stable DC 23 is generated by the rectification and filter circuit 20 and is delivered to the inverter driver circuit. The inverter driver circuit comprises the following components.

A first controller 30 for receiving input light adjustment signals and outputting light adjustment cycle signals 31. A second controller 40 for receiving the light adjustment cycle signals 31 and outputting electrical conduction cycle signals 41. The second controller 40 is either electrically connected to the power source 10 or electrically connected to the rectification and filter circuit 20 for obtaining a wave current 101, 211. Electrical conduction of the electrical conduction cycle signals 41 depends on input on/off of the wave current 101, 211 at the second controller 40.

A driver 50 for receiving the electrical conduction cycle signals 41 and outputting varying voltage pulse signals 51 in response to input on/off of the DC 23. Varying voltage pulse signals 51 are generated in response to electrical conduction cycle signals 41 being enabled or not by input on/off of the DC 23. A transformer 60 for receiving the varying voltage pulse signals 51 and outputting a converted voltage 61 to the load 70 for activation. The converted voltage 61 is a varying voltage depending on the varying voltage pulse signals 51.

Each of the first controller 30 and second controller 40 is implemented as a microcontroller or a pulse width modulation controller. The driver 50 is implemented as a power transistor. The transformer 60 is implemented as a winding transformer or piezoelectric transformer.

Figure 3:
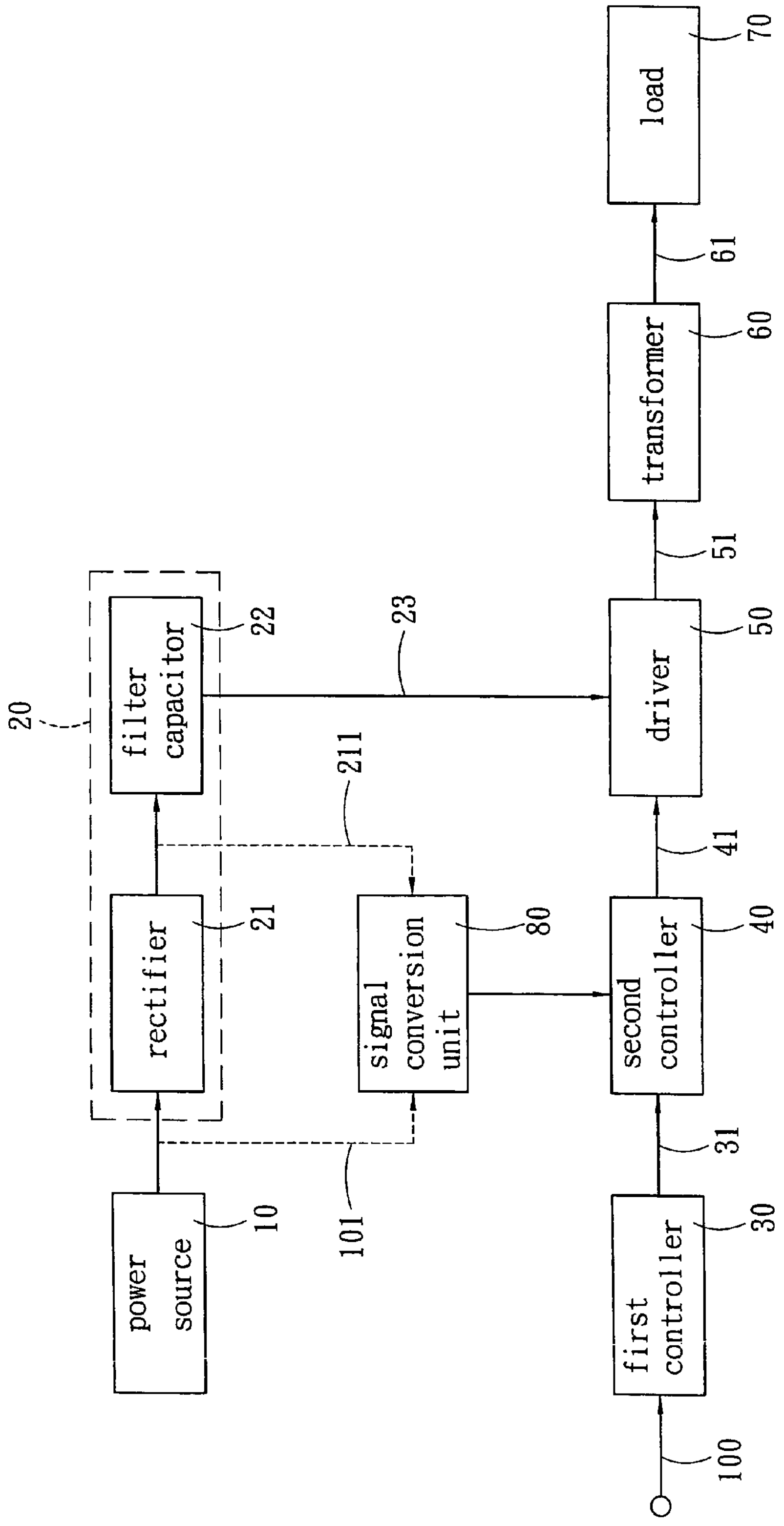
FIG. 3 is a block diagram of a second preferred embodiment of inverter circuit according to the invention.

Referring to FIG. 3, an inverter circuit in accordance with a second preferred embodiment of the invention is shown. The second embodiment is identical to the first embodiment, except that a signal conversion unit 80 is electrically connected to the second controller 40 and is either electrically connected to the power source 10 or electrically connected to the rectification and filter circuit 20 for obtaining a wave current 101, 211. The signal conversion unit 80 is implemented as a waveform phase converter, signal amplifier, rectification and filter, or a combination thereof. Following is a discussion about waveforms of the inverter driver circuit of the invention and the prior inverter circuit incorporated a power factor corrector 90.

Figure 4A:
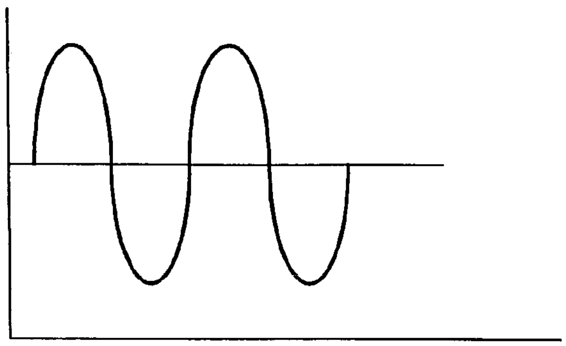
FIGS. 4A to 4F are waveforms of the invention.
Figure 4B:
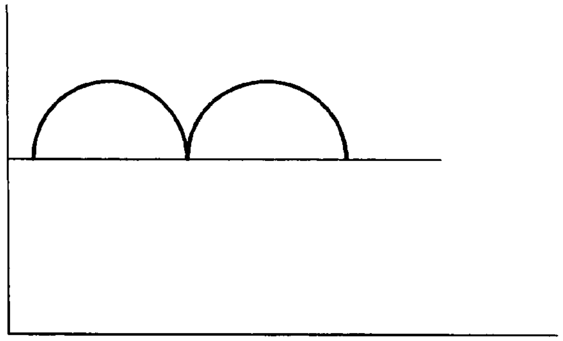
Figure 4C:
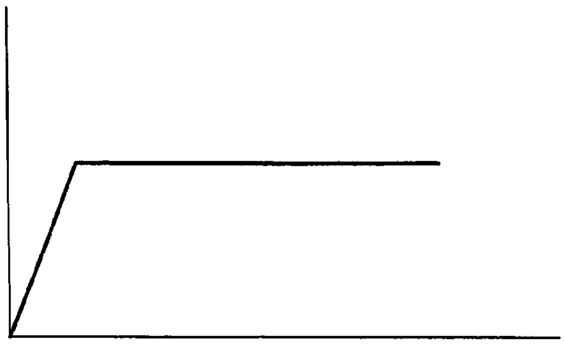

Referring to FIG. 4A, a sinusoidal input of the power source 10 of the invention is identical to that of the power source of the prior art as shown. Referring to FIG. 4B, a negative one half period of the sinusoidal input of the power source 10 of the invention is rectified as a positive one half period thereof and similarly a negative one half period of the sinusoidal input of the power source of the prior art is rectified as a positive one half period thereof. Referring to FIG. 4C, a waveform of input voltage being filtered or corrected in its power factor according to the invention and that according to the prior art as shown. Straight line means a stable DC 23 is obtained by both the invention and the prior art. Note that no current phase compensation effect is produced by the filter of the invention since no power factor corrector is employed. That is, the stable DC 23 of the invention does not have power factor correction effect.

Figure 4D:
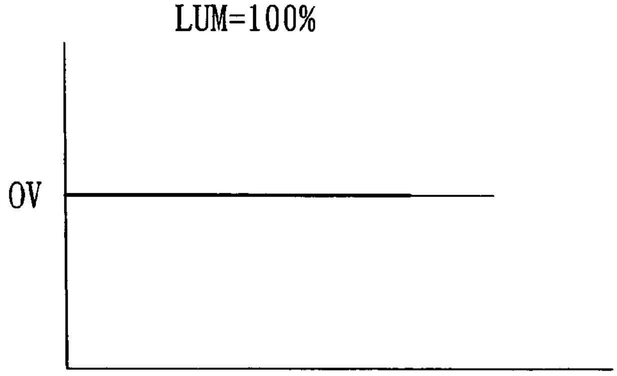
Figure 4E:
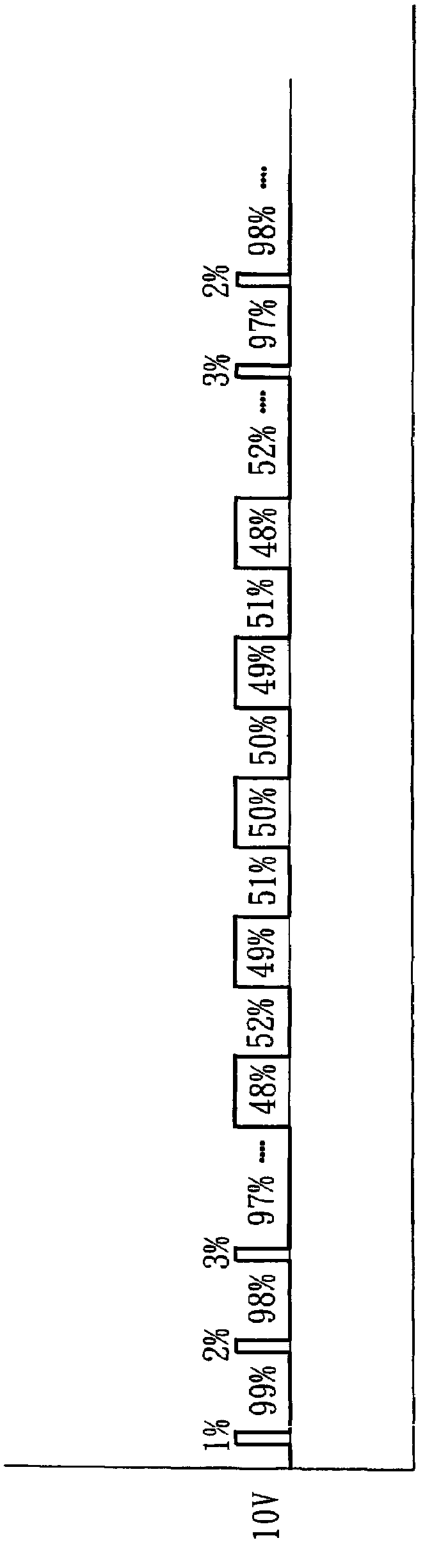

Referring to FIG. 4D, a lower part shows waveform of a light adjustment cycle signal 31 outputted by the first controller 30 when input light adjustment signal 100 is completely bright according to the invention. According to the prior art in the upper part of FIG. 4E, the second controller 40 is continuously enabled to output electrical conduction cycle signals 41 in response to alternate activation of the light adjustment cycle signals 31 in which conduction (i.e., on) time is equal to cut-off (i.e., off) time (i.e., each is 50%). According to the invention in the lower part of FIG. 4E, the second controller 40 is enabled by wave currents 101, 211 in which the wave current 211 is represented by a lower part of FIG. 4B and the wave current 101 from the power source 10 is represented by a lower part of FIG. 4A. Thus, electrical conduction cycle signals 41 outputted by the second controller 40 may change its voltage in a predetermined percentage in the sequence of low voltage, high voltage, and low voltage in response to both inputs of wave currents 101, 211. As shown in the lower part of FIG. 4E (i.e., the invention), the voltage in a predetermined percentage is increased from 1% to 50% in which increment may be altered in response to input voltage and input light adjustment signals 100, and is further decreased from 50% to 1%. The subsequent driver 50 may receive electrical conduction cycle signals 41 for converting a stable DC 23 into varying voltage pulse signals 51.

Figure 4F:
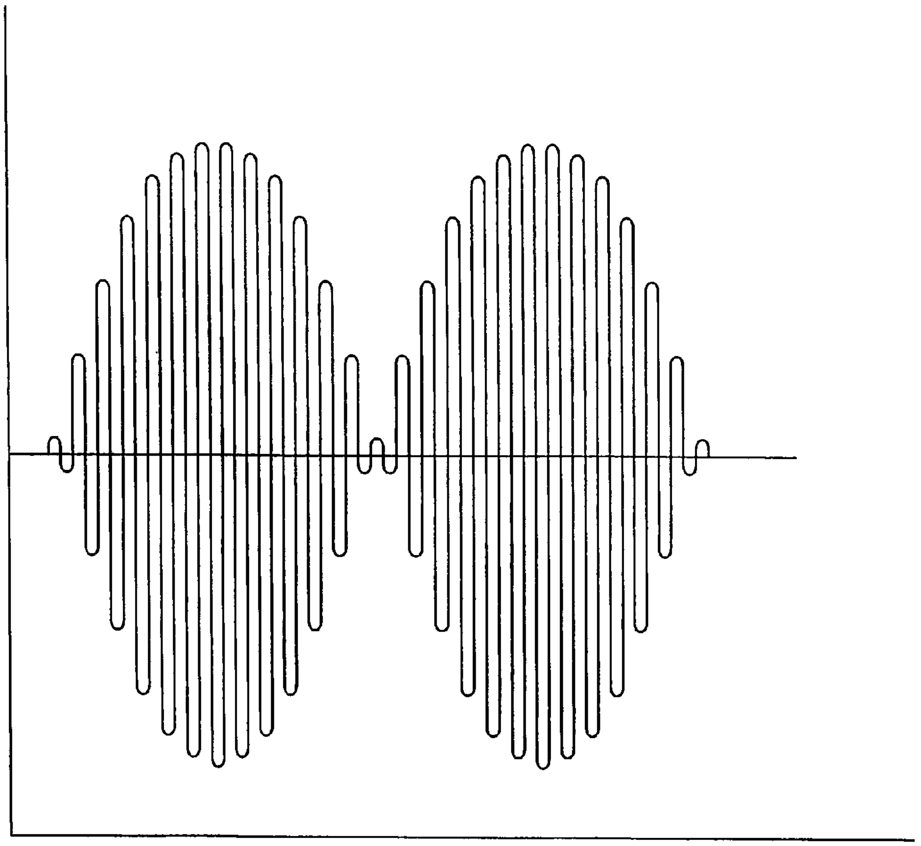
Figure 5A:
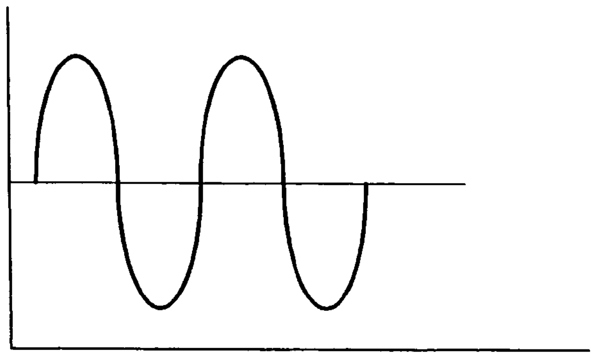
FIGS. 5A to 5F are waveforms of the prior art.
Figure 5B:
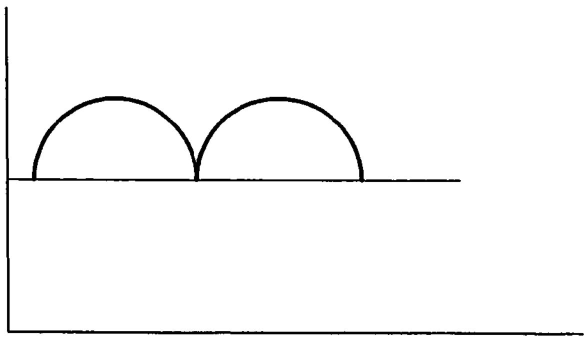
Figure 5C:
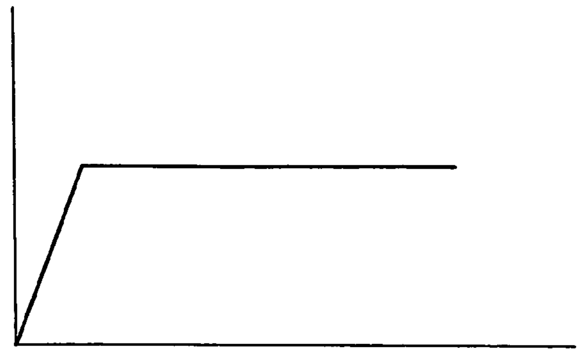
Figure 5D:
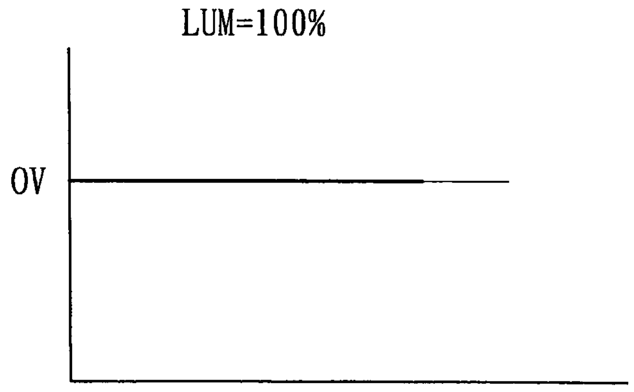
Figure 5E:
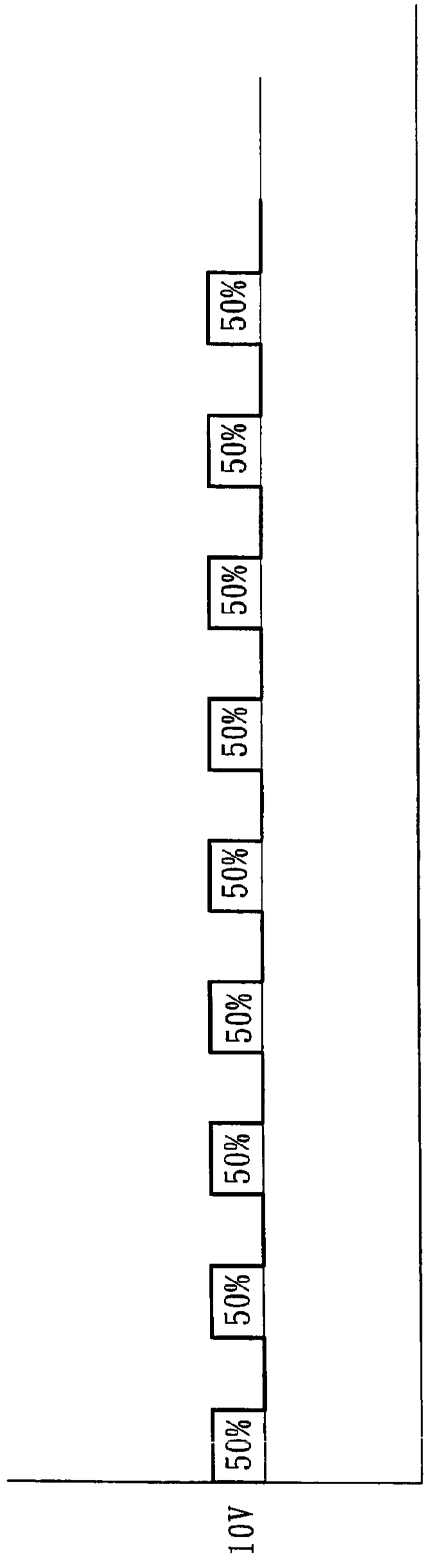
Figure 5F:
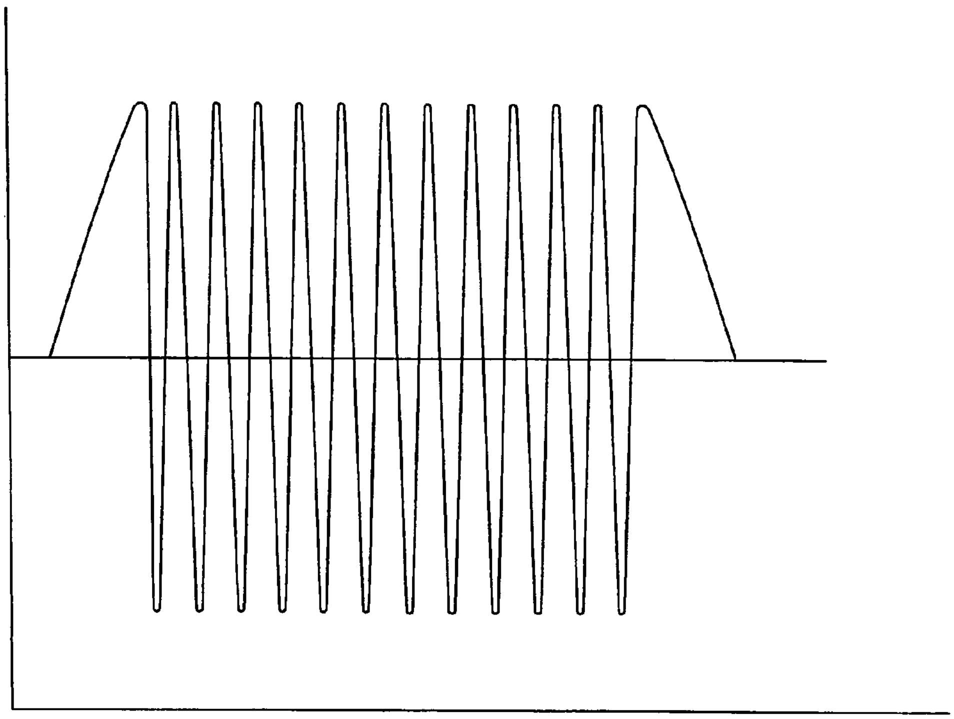

Referring to FIG. 4F, a current phase compensation is produced by a power factor corrector 90 when the transformer 60 drives the load 70 according to the prior art (see upper part of FIG. 4F). Thus, voltage applied to the transformer 60 is a stable high voltage DC and the transformer 60 is required to operate in high driver oscillation. As a comparison (see lower part of FIG. 4F), the transformer 60 of the invention is adapted to convert DC voltage into a varying voltage for driving the load 70 based on varying voltage pulse signals 51. Thus, power factor correction effect is produced. For example, the load 70 is implemented as a lamp and a flashing frequency thereof is set based on an application of the invention. For example, the invention is applied in a liquid crystal display (LCD). An operating frequency of LCD is set at a value higher than 60 Hz based on flash acceptable to human eyes since LCD is watched by the human eyes. The higher of the operating frequency the lower of the adverse flash to the human eyes will be. Preferably, the operating frequency is about 72 KHz. Thus, the invention can divide a voltage into 1200 continuous cycles each consisting of a lowest voltage, a highest voltage, and a lowest voltage. The transformer 60 may drive the load 70 to emit light whenever the transformer 60 is enabled. Thus, a dark, bright, and dark flashing effect is produced on the load 70. Advantageously, flashing does no harm to human eyes since it is not sensitive to human eyes. In another example, the load 70 is implemented as a neon light and an operating frequency thereof is set at a value lower than 60 Hz. As a result, a flashing effect of neon light is produced. More preferably, the rectifier 21 of the rectification and filter circuit 20 is implemented as a half-wave rectifier so as to send out light at predetermined intervals.

Additionally, a low performance power factor corrector 90 is added into the invention in consideration of poor power quality of some regions or countries. Preferably, power factor correction effect is increased no more than 20%. This is because high performance power factor corrector may increase the manufacturing cost greatly and complicate circuitry of the invention and this is not desirable.

While the invention herein disclosed has been described by means of specific embodiments, numerous modifications and variations could be made thereto by those skilled in the art without departing from the scope and spirit of the invention set forth in the claims.

What is claimed is:

1. An inverter circuit for producing power factor correction effect including a power source, a rectification and filter circuit including a rectifier and a filter capacitor, and an inverter driver circuit interconnected the rectification and filter circuit and a load wherein a DC is generated by the rectification and filter circuit and is delivered to the inverter driver circuit, the inverter driver circuit comprising:

a first controller for receiving input light adjustment signals and outputting light adjustment cycle signals;

a second controller for receiving the light adjustment cycle signals and outputting electrical conduction cycle signals wherein the second controller is selected from being electrically connected to a power source and electrically connected to the rectification and filter circuit for obtaining a wave current, and an electrical conduction of the electrical conduction cycle signals depends on an input on/off of the wave current at the second controller;

a driver for receiving the electrical conduction cycle signals and outputting varying voltage pulse signals in response to the input on/off of the DC wherein the varying voltage pulse signals are generated in response to the electrical conduction cycle signals being enabled or not by the input on/off of the DC; and a transformer for receiving the varying voltage pulse signals and outputting a converted voltage to the load for activation wherein the converted voltage is a varying voltage depending on the varying voltage pulse signals.

2. The inverter circuit of claim 1, further comprising a signal conversion unit electrically connected to the second controller wherein the signal conversion unit is selected from being electrically connected to the power source and electrically connected to the rectification and filter circuit for obtaining the wave current.

3. The inverter circuit of claim 2, wherein the signal conversion unit can be selected from a waveform phase converter, a signal amplifier, a rectification and filter, and a combination thereof.

* * * * *